Patented Apr. 7, 1925.

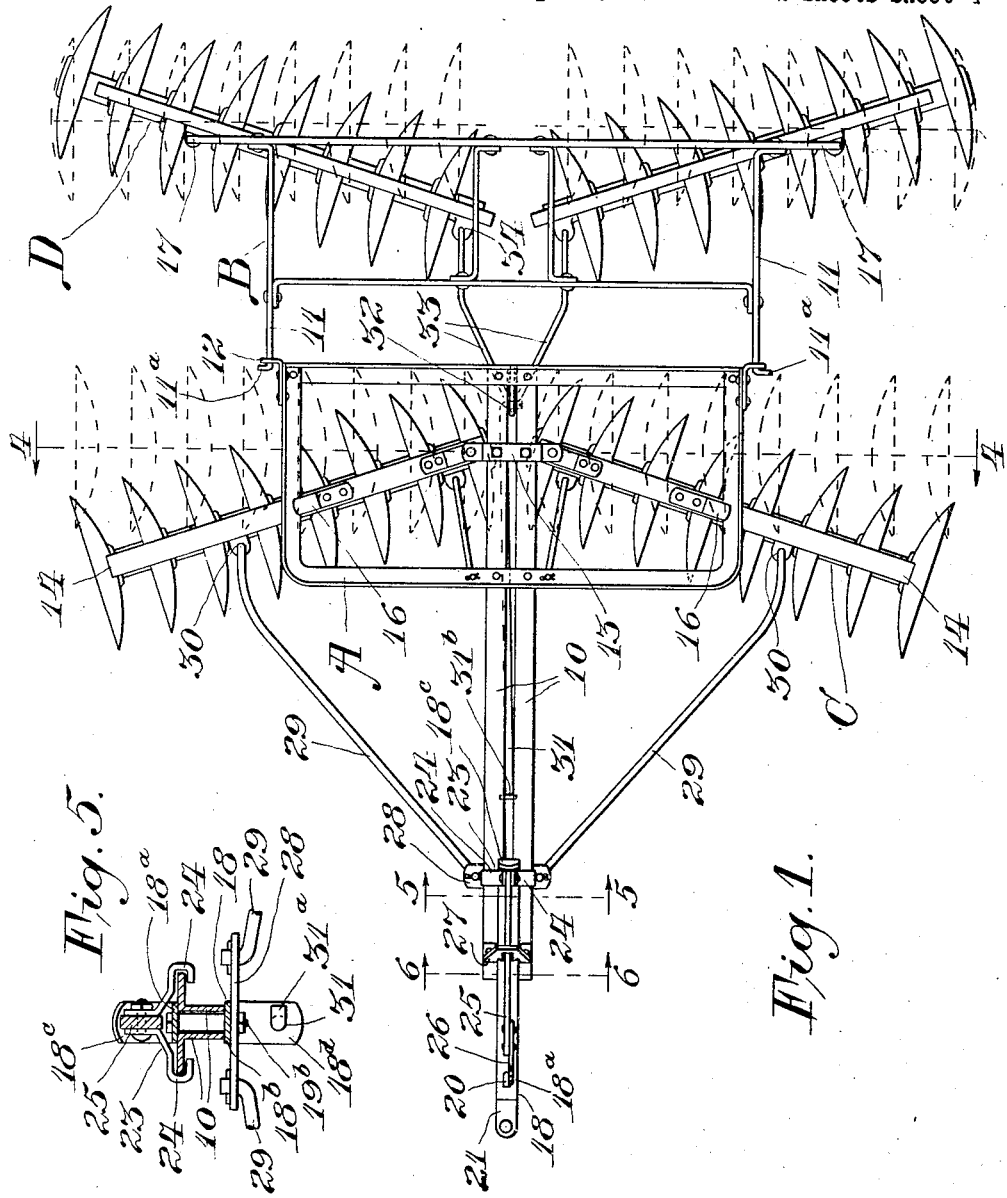

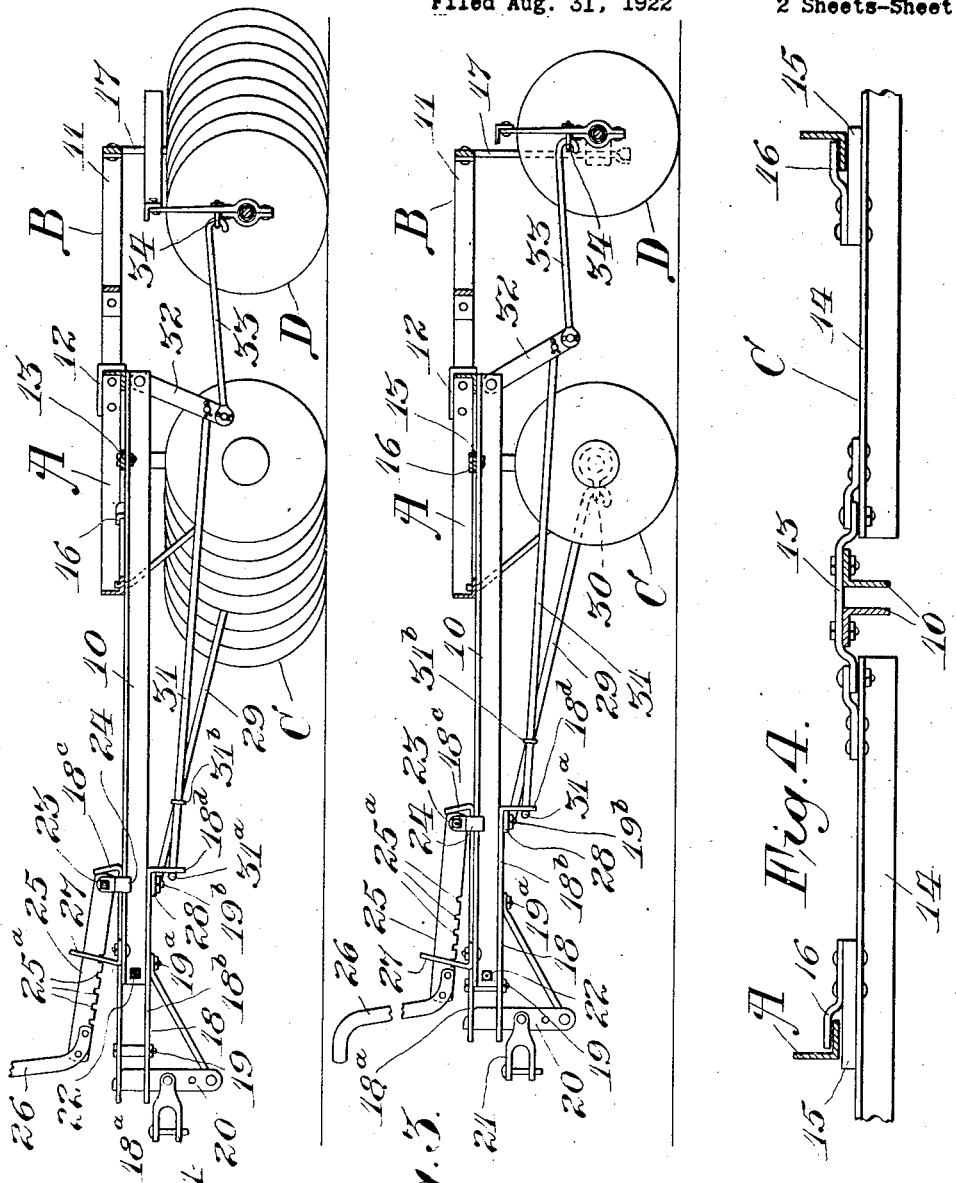

1,533,029

UNITED STATES PATENT OFFICE.

CHARLES W. ROBINSON AND WILLIAM C. DWYER, OF AUBURN, NEW YORK, ASSIGNORS TO INTERNATIONAL HARVESTER COMPANY, OF CHICAGO, ILLINOIS, A CORPORATION OF NEW JERSEY.

TRACTOR DISK HARROW.

Application filed August 31, 1922. Serial No. 585,351.

*To all whom it may concern:*

Be it known that we, CHARLES W. ROBINSON and WILLIAM C. DWYER, citizens of the United States, and residents, respectively, of Auburn, in the county of Cayuga and State of New York, and of Auburn, in the county of Cayuga and State of New York, have invented certain new and useful Improvements in Tractor Disk Harrows, of which the following is a full, clear, and exact specification.

This invention relates to angling mechanism for the disk gangs of tractor drawn harrows and is directed more particularly to improvement in the draft operated or so-called automatic type of angling mechanism in which forward and backward movement of the tractor is employed to shift or swing the disk gangs to and from angled or working position.

The objects of the invention are to simplify the construction and improve the ease of control in this class of devices and to insure quick and positive angling of the disk gangs by direct pull of the tractor and positive straightening of the gangs by backing the tractor.

The desired objects have been attained by devising a novel form of control for the sliding draft head in which the angle given the gangs is regulated by movement of a stop device or snub which limits outward movement of the draft head on the draft frame or tongue of the harrow and by devising novel operating connections between the draft head and the several disk gangs.

The invention accordingly resides in the organization and details of construction hereinafter set forth and claimed, or in the substantial equivalents thereof.

Having reference to the drawings:

Fig. 1 is a plan view of a tandem tractor harrow embodying the invention.

Fig. 2 is a side view of the harrow showing the position taken by the several parts when the gangs are in angled or working position.

Fig. 3 is a similar view with the gangs in straight or non-working position.

Fig. 4 is a transverse section of the line 4—4 of Fig. 1, showing the connections of the front disk gangs to the frame.

Fig. 5 is a detail sectional view on the line 5—5 of Fig. 1 showing the relation of the angle controlling mechanism to the draft tongue members; and Fig. 6 is a detail view on the line 6—6 of Fig. 1 showing the catch bracket for the angle controlling mechanism.

The invention is disclosed as embodied in a tandem disk harrow comprising the front section or frame A which is substantially rectangular in form and has centrally secured thereto a pair of forwardly extending angle iron members 10 forming the draft tongue. The rear frame or section B is also of substantially rectangular form and its side members 11 project forwardly, forming connecting members which are slidably received in brackets 12 on the rear corner of the front frame A. The members 11 have their forward ends out-turned as at 11$^a$ to form stops and there is thus provided a flexible coupling or draft connection between the two harrow sections which permits a limited degree of telescopic action between the frames when the front section is backed, and also a certain amount of flexibility on a turn as the openings in the brackets 12 are sufficiently large to permit free movement of the connecting arms 11. The front section A carries a pair of disk gangs C which are pivotally connected at their inner ends to the ends of a transversely extending strap 13 fixed to the rear ends of the tongue members 10 as shown in Fig. 4. In order to guide each disk gang and retain it in proper position on the frame, each gang frame 14 is provided with a bearing block 15 on its upper side to which is secured a cleat 16 which has its outer end spaced from the bearing block in such a way that it engages the upper face of the horizontal web of the main bar while the bearing block 15 engages the under face. The disk gangs D on the rear frame are pivoted thereto near their outer ends on extensions 17 of the rear transverse frame member. There is thus provided an arrangement of disk gangs in which the outer ends of the front gangs may be moved about pivots at their inner ends while the inner ends of the rear gangs are moved about pivots near their outer ends. To effect this movement there is provided a sliding draft head 18 which comprises parallel upper and lower bars 18$^a$, 18$^b$ on the upper and under sides of the tongue members respectively. The forward ends of these bars are connected by a spacing bolt 19 and have secured thereto a vertical draft plate 20 and clevis 21. At its rear end, the upper bar 18ᵃ is upturned as at 18ᶜ, providing a substantially vertical projection or lug extending above the tongue and the lower bar 18ᵇ is down-turned as at 18ᵈ and this downturned end is provided with a perforation for a purpose to be described. Additional spacing bolts 19ᵃ, 19ᵇ connect the draft head members, bolt 19ᵃ being substantially midway between the other two and passing in the space between the two members of the draft tongue 10, which members are connected at their front ends by a transverse spacing bolt 22. This construction of the draft head and its relation to the tongue member is such that it may slide back and forth on the tongue to an extent normally limited by the spacing bolts 19 and 19ᵃ which are positioned on either side of the transverse bolt 22 which acts as a stop. Also mounted on the forward end of the draft tongue, and above the sliding draft head just described, is an adjustable stop device 23 comprising a guide element formed of a pair of guide plates 24 (Fig. 5) which are shaped to embrace the members of the draft tongue and to provide upright portions between which there is pivoted the rear end of a forwardly extending adjusting member 25 which is provided with an upwardly directed operating handle 26. The adjusting member 25 is formed with a number of rack teeth 25ᵃ on its lower edge and said member passes through an opening on a catch bracket 27 fixed to the forward end of the draft tongue as shown in Fig. 6. This catch bracket 27 is preferably a metal plate adapted to engage the depressions or notches between the rack teeth 25ᵃ thereby acting as a catch or lock for the adjusting bar 25 which drops by gravity and is therefore self-retaining when released. As clearly seen in Figures 2 and 3, the stop device is positioned in advance of the upward projection 18ᶜ on the draft head and the adjusted position of the stop device will determine the extent to which the draft head can be pulled forwardly on the tongue, as contact of the projection 18ᶜ with the stop 23 limits such outward movement. The rear underside of the draft head 18 has fixed to it by the spacing bolt 19ᵇ a transverse plate or bar 28 (Fig. 5) to each end of which there is pivoted the upturned end of a rigid angling link 29 which is pivoted at its rear end to the outer portion of a front gang as at 30, and in the perforation in the downwardly bent end 18ᵈ of the draft head there is slidably received the forward end of a rod 31 which has its rear end supported by a pendulum link 32 suspended from the rear end of the front harrow frame. The front end of the rod 31 is bent or otherwise shaped to provide a stop 31ᵃ and a stop collar 31ᵇ is fixed on the rod at a distance from its front end giving a degree of lost motion corresponding approximately to the amount of telescopic movement possible between the harrow sections A and B as above described. The pendulum link 32 also supports the forward ends of a pair of rigid angling links 33 which have their rear ends pivotally connected to the inner ends of the respective rear gangs as at 34. With the construction described, it will be evident that the movement of the draft head 18 back and forth on the tongue by the push and pull of a tractor coupled to clevis 21 will forcibly cause angling of the gangs on forward movement and straightening of the gangs on backward movement, and that adjustment of the stop device 23, which is movable independently of the draft head, will determine the degree to which the draft head can move outwardly and therefore the degree to which the gangs will be angled, and that when the stop device is at its extreme rear adjustment, as in Figure 3, the disk gangs will be held in straight or non-working position during travel of the harrow. The operation of a harrow constructed according to this invention is substantially as follows:

When the gangs are in straightened or transporting position (Fig. 3), and it is desired to angle them for work, the operator, by means of the handle 26, raises the adjusting bar 25 and moves it forwardly until the guide plates and bar constituting the stop device 23 are moved forward either to their full extent as in Fig. 2 or to a lesser degree if less than the full angle in the gangs is desired, and when the bar is then released, one of the teeth will be engaged by the catch plate 27 and the stop device thus locked against further movement. If the harrow is at a standstill when this is done, the draft head will slide forwardly on the tongue when the tractor starts until the projection 18ᶜ strikes the stop device or snub and, as the gangs must swing as the draft head moves forwardly, they will assume the angle that has been set by moving the stop device forwardly as just described. Should the harrow be traveling during adjustment of the stop as above stated, the draft head will simply follow the stop forwardly and the gangs be angled during travel. If then the gangs are to be straightened from the position shown in Figure 2, the tractor is backed, forcing the draft head rearwardly on the tongue and forcibly straightening the front gangs through the thrust of the rigid links 29 on their outer ends as the draft head moves backwardly, the end 18ᵈ of the draft heads telescoping on the rod 31 until stop 31ᵇ is reached at which point straightening of the front gangs is completed. The handle bar 26 is then raised and the stop moved back to the position shown in Fig. 3, thereby locking the front gangs in straightened or non-working position, and on forward movement of the harrow under these conditions, the rear gangs will also straighten through thrust of the ground on the disks, as rod 31 will be free to slide back in the end 18ᵈ of the draft head until stop 31ᵃ prevents further movement. If backing is continued after the draft head has been moved back to its full extent, the front section A of the harrow will be moved towards the rear section on the telescoping connections 11, 12, and as stop 31ᵇ on rod 31 prevents further telescoping of the rod 31 through the end 18ᵈ of the draft head, a thrust will be transmitted through the rod 31 and links 33 of the inner ends of the rear gangs which will serve to forcibly or positively straighten them also.

Having thus described our invention, what is claimed is:

1. In draft operated angling mechanism for tractor disk harrows, the combination with the draft tongue and gangs, of a draft head slidable back and forth on the tongue, means for angling the gangs by forward movement of the draft head and strightening the gangs by reverse movement, and a self retaining slidable stop device on the tongue having a range of movement equivalent to that of the draft head for setting the limit of forward movement of the draft head.

2. In draft operated angling mechanism for tractor disk harrows, the combination with the draft tongue and gangs, of a draft head slidable back and forth on the tongue, operating connections between the draft head and the gangs, means comprising a stop device adjustable back and forth on the tongue independently of the draft head for limiting movement of the draft head in one direction, and latch mechanism for retaining said device in adjusted position.

3. In draft operated angling mechanism for tractor disk harrows, the combination with the draft tongue and a pair of gangs, of a draft head slidable back and forth on the tongue, rigid links connecting the draft head with the outer portions of the gangs, a stop device adjustable back and forth on the forward end of the tongue independently of said draft head and limiting forward movement thereof on the tongue, and latch mechanism including a forwardly directed operating element for retaining said device in adjusted position.

4. In draft operated angling mechanism for tractor disk harrows, the combination with the draft tongue and a pair of gangs, of a draft head slidable back and forth on the tongue, rigid links connecting the draft head with the outer portions of the gangs, a stop device slidable back and forth on the forward end of the tongue independently of the draft head and limiting forward movement thereof on the tongue said device including a forwardly extending locking element longitudinally moveable with respect to the tongue.

5. In draft operated angling mechanism for tractor disk harrows, the combination with the draft tongue and gangs, of a draft head slidable back and forth on the tongue, operating connections between the draft head and the gangs, a stop device slidable back and forth on the tongue independently of the draft head and limiting movement of the draft head in one direction said device including a forwardly extending locking element longitudinally movable with respect to the tongue.

6. In draft operated angling mechanism for tractor disk harrows, the combination with the draft tongue and gangs, of a draft head slidable back and forth on the tongue, operating connections between the draft head and the gangs, a stop device slidable back and forth on the tongue independently of the draft head and limiting movement of the draft head in one direction, including a rack bar longitudinally adjustable on the tongue and a fixed catch on the tongue adapted to engage the teeth on the rack bar.

7. In draft operated angling mechanism for tractor disk harrows, the combination with the draft tongue and a pair of gangs, of a draft head slidable back and forth on the forward end of the tongue and having a lug projecting above the tongue, rigid links connecting the draft head with the outer portions of the gangs, a stop device independently adjustable back and forth on the forward end of the tongue above said draft head and in advance of said projecting lug and adapted to be engaged thereby to limit outward movement of the draft head on the tongue, and a pivoted latch member connecting the stop device with the tongue.

8. In draft operated angling mechanism for tractor disk harrows, the combination with the draft tongue and a pair of gangs, of a draft head slidable back and forth on the forward end of the tongue and having a portion projecting above the tongue, rigid links connecting the draft head with the outer portions of the gangs, a stop device independently adjustable back and forth on the forward end of the tongue above said draft head and in advance of said projecting portion thereof and adapted to be engaged thereby to limit outward movement of the draft head on the tongue, and a forwardly extending adjusting element included in said stop device and having means for retaining said device in adjusted position longitudinally of the tongue.

9. In draft operated angling mechanism for tractor disk harrows, the combination with the draft tongue and a pair of gangs, of a draft head comprising a longitudinally extending bar slidable back and forth on the front end of the tongue, said bar having a vertical projection at its rear end, rigid links connecting the draft head with the outer portions of the gangs, a stop device independently adjustable back and forth on the forward end of the tongue above said bar and in advance of said vertical projection, said device comprising a guide portion loosely engaging the tongue and a forwardly extending adjusting member pivoted to the guide portion at its rear end and having an operating handle at its front end, rack teeth on said member, and a cooperating catch on the tongue.

10. A tractor harrow comprising a frame, a draft tongue thereon, a draft head slidable back and forth on the tongue, a pair of disk gangs pivotally connected at their inner ends to said frame, rigid links connecting the draft head with the outer portion of each gang, a second frame coupled behind the first frame, a pair of disk gangs pivotally connected near their outer ends to said second frame, a rod connected at its front end to said draft head and supported at its rear end below the front frame, and links connecting the rear end of said rod to the inner ends of the rear gangs.

11. A tractor harrow comprising a frame, a draft tongue thereon, a draft head slidable back and forth on the tongue, a pair of disk gangs pivoted at their inner ends to said frame, rigid links connecting the draft head with the outer portion of each gang, a second frame coupled behind the first frame by means permitting limited movement of the front frame towards the rear frame when the harrow is backed, a pair of disk gangs pivotally connected near their outer ends to said second frame, a rod with its front end connected to said draft head by a lost motion coupling and supported at its rear end below the front frame, and links connecting the rear end of said rod to the inner ends of the rear gangs.

In testimony whereof we affix our signatures.

CHARLES W. ROBINSON.
WILLIAM C. DWYER.